(12) United States Patent
Craft

(10) Patent No.: US 6,959,786 B2
(45) Date of Patent: Nov. 1, 2005

(54) SLOPE COMPENSATING TREE STAND

(76) Inventor: Roger A. Craft, 129 Highpoint Dr., Gulf Breeze, FL (US) 32561

( * ) Notice: Subject to any disclaimer, the term of this patent is extended or adjusted under 35 U.S.C. 154(b) by 49 days.

(21) Appl. No.: 10/780,017

(22) Filed: Feb. 17, 2004

(65) Prior Publication Data

US 2005/0178618 A1   Aug. 18, 2005

(51) Int. Cl.[7] .......................... E04G 3/00; A63B 27/00; A47B 5/00; A47C 31/00
(52) U.S. Cl. ...................... 182/187; 182/135; 108/152; 297/217.7
(58) Field of Search .............................. 182/135, 137, 182/136, 188, 133, 20, 116; 108/152; 297/217.7

(56) References Cited

U.S. PATENT DOCUMENTS

| | | | |
|---|---|---|---|
| 4,549,635 A * | 10/1985 | Early | 182/187 |
| 4,726,447 A * | 2/1988 | Gibson et al. | 182/135 |
| 4,730,699 A | 3/1988 | Threlkeld | |
| 4,953,662 A * | 9/1990 | Porter | 182/135 |
| 4,997,063 A * | 3/1991 | Bradley | 182/187 |
| 5,016,733 A * | 5/1991 | Bradley | 182/187 |
| 5,090,506 A | 2/1992 | Womack et al. | |
| 5,143,177 A | 9/1992 | Smith | |
| 5,316,104 A | 5/1994 | Amacker | |
| 5,458,215 A | 10/1995 | Burgin | |
| 5,492,198 A * | 2/1996 | Williams | 182/136 |
| 5,927,437 A | 7/1999 | Fast | |
| RE36,276 E | 8/1999 | Smith | |
| 5,954,158 A * | 9/1999 | Concepcion | 182/187 |
| 5,996,738 A | 12/1999 | Nelsen | |
| 6,196,354 B1 | 3/2001 | Anthony et al. | |
| 6,336,520 B1 | 1/2002 | Amacker | |
| 6,367,585 B1 | 4/2002 | Fast | |
| 6,386,321 B1 | 5/2002 | Muhich | |
| 6,390,239 B1 * | 5/2002 | McClain | 182/187 |
| 6,571,916 B1 * | 6/2003 | Swanson | 182/187 |
| 6,578,913 B2 * | 6/2003 | Wilhelm | 297/217.7 |
| 6,595,325 B2 | 7/2003 | Ulrich | |
| 6,866,120 B1 * | 3/2005 | Butterworth | 182/187 |

* cited by examiner

Primary Examiner—Hugh B. Thompson, II
(74) Attorney, Agent, or Firm—J. Wiley Horton

(57) ABSTRACT

A tree stand with adjusting features allowing it to remain level in use. The invention includes two main subassemblies—a lower foot platform and an upper seat platform. The foot platform features a pivotally attached foot rest portion which can be adjusted in pitch. The seat platform includes a rotating seat with a pitch pivot located underneath. The seat's pitch is infinitely adjustable without affecting its rotation about the yaw axis. The seat platform also includes two telescoping climbing arms which the user can grasp when moving the two platforms up a tree. These climbing arms can be stowed once the stand is in position for use.

20 Claims, 13 Drawing Sheets

SLOPE COMPENSATING TREE STAND

BACKGROUND OF THE INVENTION

1. Field of the Invention.

This invention relates to the field of tree stands. More specifically, the invention comprises a tree stand incorporating adjustment features allowing it to assume a level attitude when attached to a sloping object.

2. Description of the Related Art

Tree stands have been in common use for many years. Some of these stands are made as a separate footrest assembly and seat assembly. These two separate assemblies can then be progressively moved up the trunk of a tree to "climb" the stand into position. One such prior art climbing stand is shown in U.S. Pat. No. 5,996,738 to Nelsen (1999). FIGS. 2A and 2B of the Nelsen disclosure illustrate the conventional use of a climbing tree stand. The Nelsen disclosure is hereby incorporated by reference.

The Nelsen disclosure also illustrates a conventional method for affixing the stand components to a tree trunk. Nelsen's FIG. 1 shows how each assembly includes a horizontal platform butted against the tree. A loop (element (6) in the view) is then passed around the tree at an acute angle to the horizontal platform. Those skilled in the art will realize that weight placed on the horizontal platform will tend to lock the assembly to the tree. By the same token, if the horizontal platform is lifted upward, the assembly can freely slide up the trunk. Thus, a user standing on the lower platform can use his or her arms to push the upper platform upward. The user can then grasp the upper platform, hook his or her feet in the lower platform, and pull the lower platform upward. These cycles are repeated to work the two platforms up the tree.

The loop around the tree (element (6)) must be substantially inelastic. If the tree diameter changes, the length of the loop must be adjusted in order to keep the platform horizontal. Of course, the diameter of most trees tapers going upward. It is generally impractical to constantly adjust the length of the loops while climbing. The platforms may therefore tend to pitch downward as the tree is climbed.

BRIEF SUMMARY OF THE PRESENT INVENTION

The present invention comprises a tree stand with adjusting features allowing it to remain level in use. The invention includes two main subassemblies—a lower foot platform and an upper seat platform. The foot platform features a pivotally attached foot rest portion which can be adjusted in pitch. The seat platform includes a rotating seat with a pitch pivot located underneath. The seat's pitch is infinitely adjustable without affecting its rotation about the yaw axis. The seat platform also includes two telescoping climbing arms which the user can grasp when moving the two platforms up a tree. These climbing arms can be stowed once the stand is in position for use.

Figure 1:
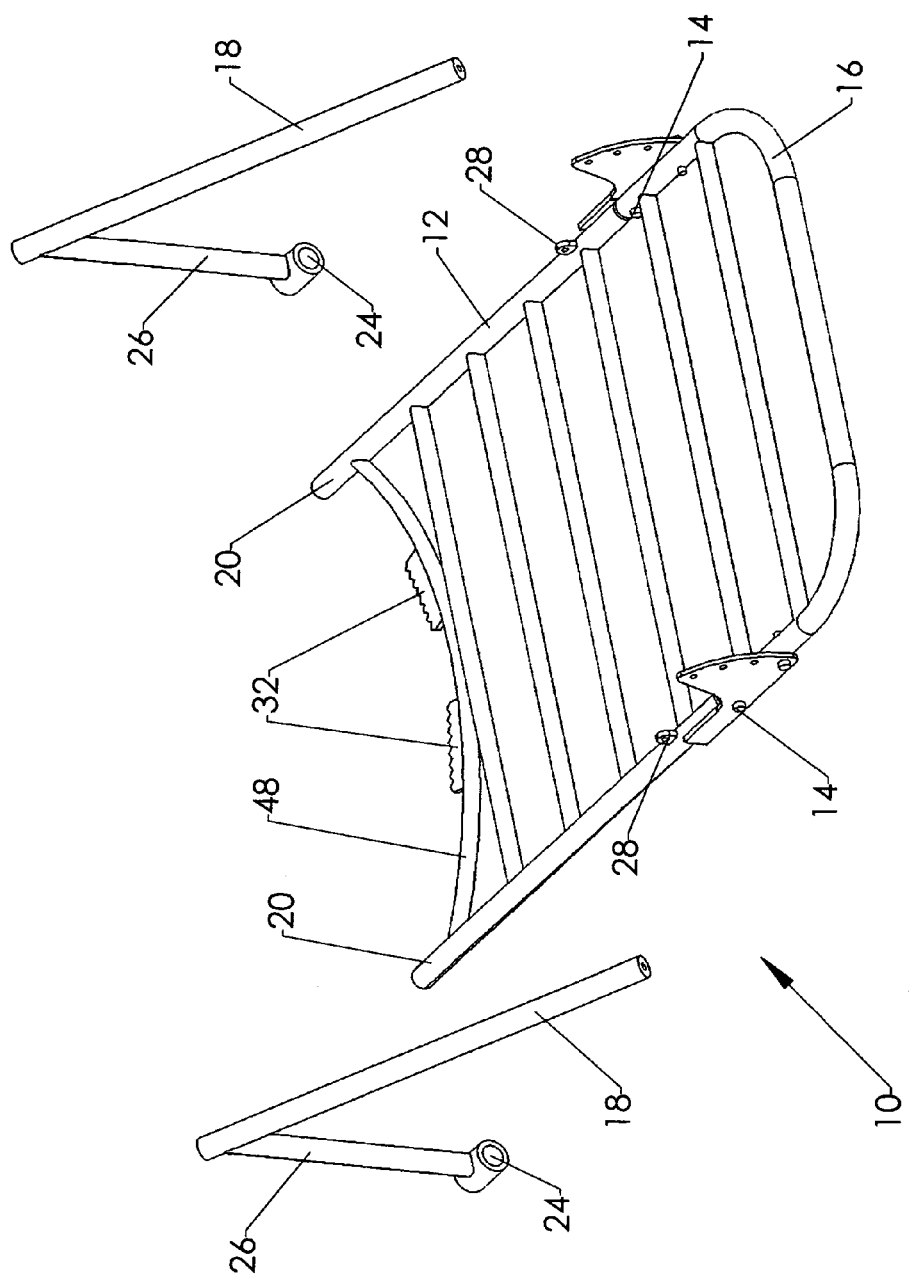
FIG. 1 is an exploded perspective view, showing the foot platform.

| REFERENCE NUMERALS IN THE DRAWINGS | | | |
|---|---|---|---|
| 10 | foot platform | 12 | foot platform frame |
| 14 | pivot joint | 16 | foot rest |
| 18 | cable guide | 20 | tube end |
| 24 | pivot tube | 26 | strut |
| 28 | fixed eye | 30 | lower cable |
| 32 | serrated plate | 34 | tree |
| 36 | adjustment plate | 38 | adjustment hole |
| 40 | locking pin | 42 | seat platform frame |
| 44 | hollow receiver | 46 | climbing arm |
| 48 | toe loop | 50 | seat tube |
| 52 | seat platform | 54 | upper cable |
| 56 | pitch pivot | 58 | yaw pivot |
| 60 | seat | 62 | rod anchor |
| 64 | pitch rod | 66 | pitch wheel |
| 68 | threaded hole | 70 | swivel block |
| 72 | swivel block pin | 74 | swivel block mount |
| 80 | toe loop | | |

DETAILED DESCRIPTION OF THE INVENTION

FIG. 1 shows foot platform 10 in an exploded view. Foot platform frame 12 is intended to remain approximately horizontal. It is formed from a series of tubes welded together to form a space frame. One side of the frame is designed to bear against a tree trunk. This side features arc 48, which is an arcuate piece of tubing having a diameter which is preferably larger than the diameter of a typical tree trunk. Two serrated plates 32 are mounted on arc 48 facing the tree. These frictionally engage the tree trunk to hold the foot platform in position.

Two tube ends 20 flank arc 48. A pivot tube 24 slides over and rotatably mounts on each tube end 20. Each pivot tube 24 is connected to a cable guide 18 by a strut 26. Each pivot tube 24, strut 26, and cable guide 18 are rigidly locked together, so that they rotate in unison about a tube end 20.

Figure 2:
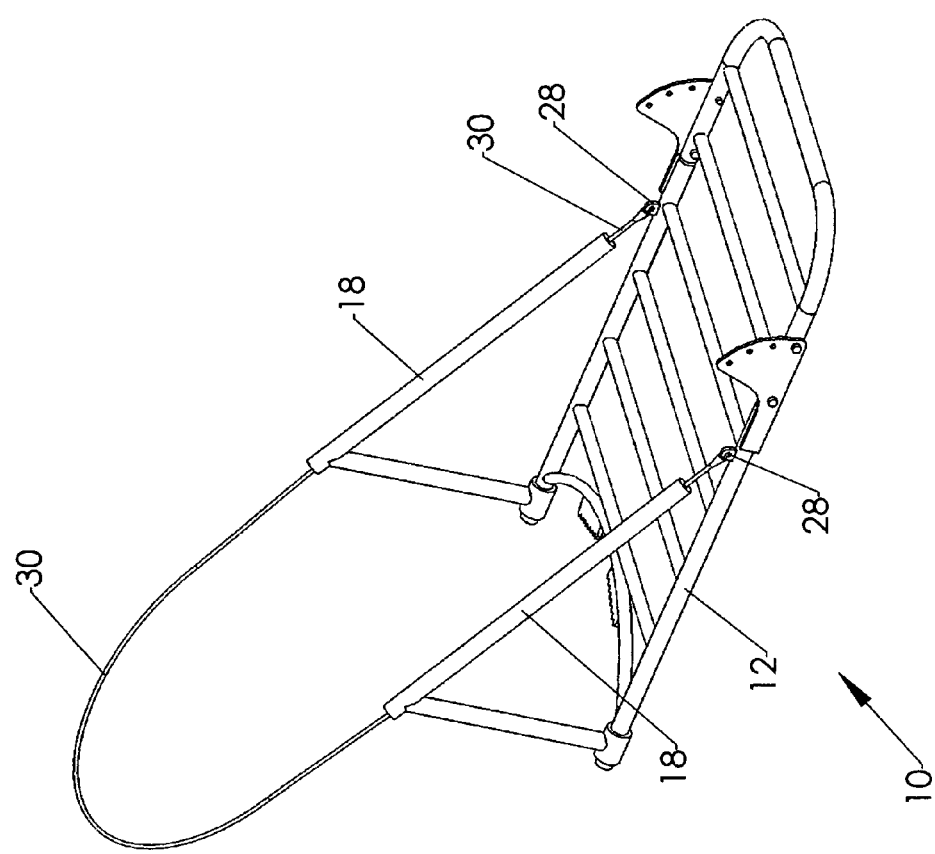
FIG. 2 is a perspective view, showing the foot platform in an assembled state.

Foot rest 16 is pivotally attached to foot platform frame 12 on the opposite side from arc 48. Foot rest 16 can be pivotally adjusted with respect to foot platform frame 12. FIG. 2 shows foot platform 10 in an assembled state. Each cable guide 18 has been attached by placing its respective pivot tube 24 over the respective tube end 20. These can be retained in place by a mechanical stop or similar device. Lower cable 30 is passed through the hollow interior of both cable guides 18 to form a loop lying above arc 48. The two free ends of the cable are attached to foot platform frame 12 near the point where foot rest 16 is attached. One or both of the cable attachments are made removable so that the device can be removed from a tree. One or more of the cable attachments is also made adjustable so that the overall length of the cable can be adjusted.

Figure 3:
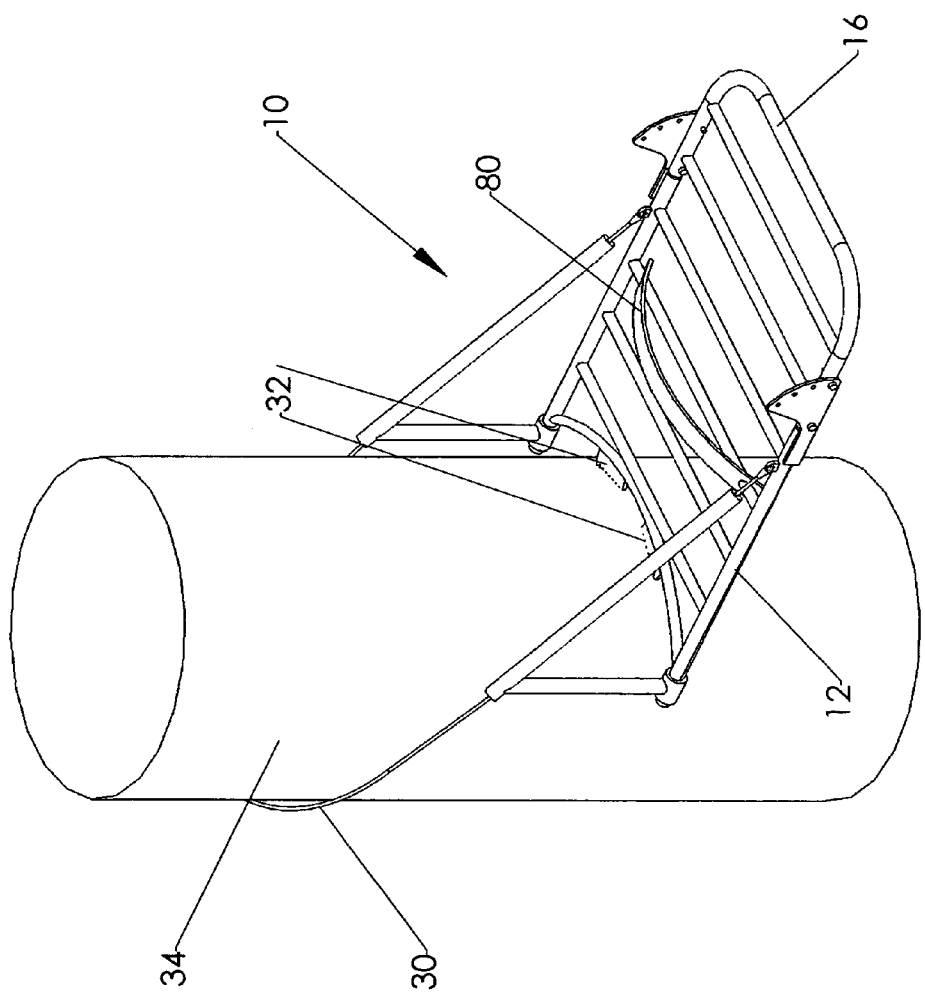
FIG. 3 is a perspective view, showing the foot platform attached to a tree.

FIG. 3 shows foot platform 10 attached to tree 34. The reader will observe how lower cable 30 is passed around the tree's trunk. The weight of the foot platform causes the two serrated plates 32 to bear against the tree and hold the assembly in position. Those skilled in the art will know that additional weight placed on foot platform frame 12 (such as by the user standing on it) will serve to increase the normal force against the tree produced by the two serrated plates. However, those skilled in the art will also know if a user lifts up the foot platform, it will be free to slide up the tree trunk.

Still looking at FIG. 3, the advantage of pivotally mounting the two cable guides to the foot platform will be explained. The platform must be able to function with trees of varying diameter. The total length of the cable can be adjusted for this purpose, so that it forms a larger or smaller loop. In the case of a smaller loop, the two struts will pivot inward to position the two cable guides further inward. This repositioning prevents the cable tension from placing a large inward force on the top of the struts, which might bend them. Thus, the combination of the pivoting cable guide assemblies and the adjustable length of the cable allows the user to apply the foot platform to trees having different diameters.

Figure 4:
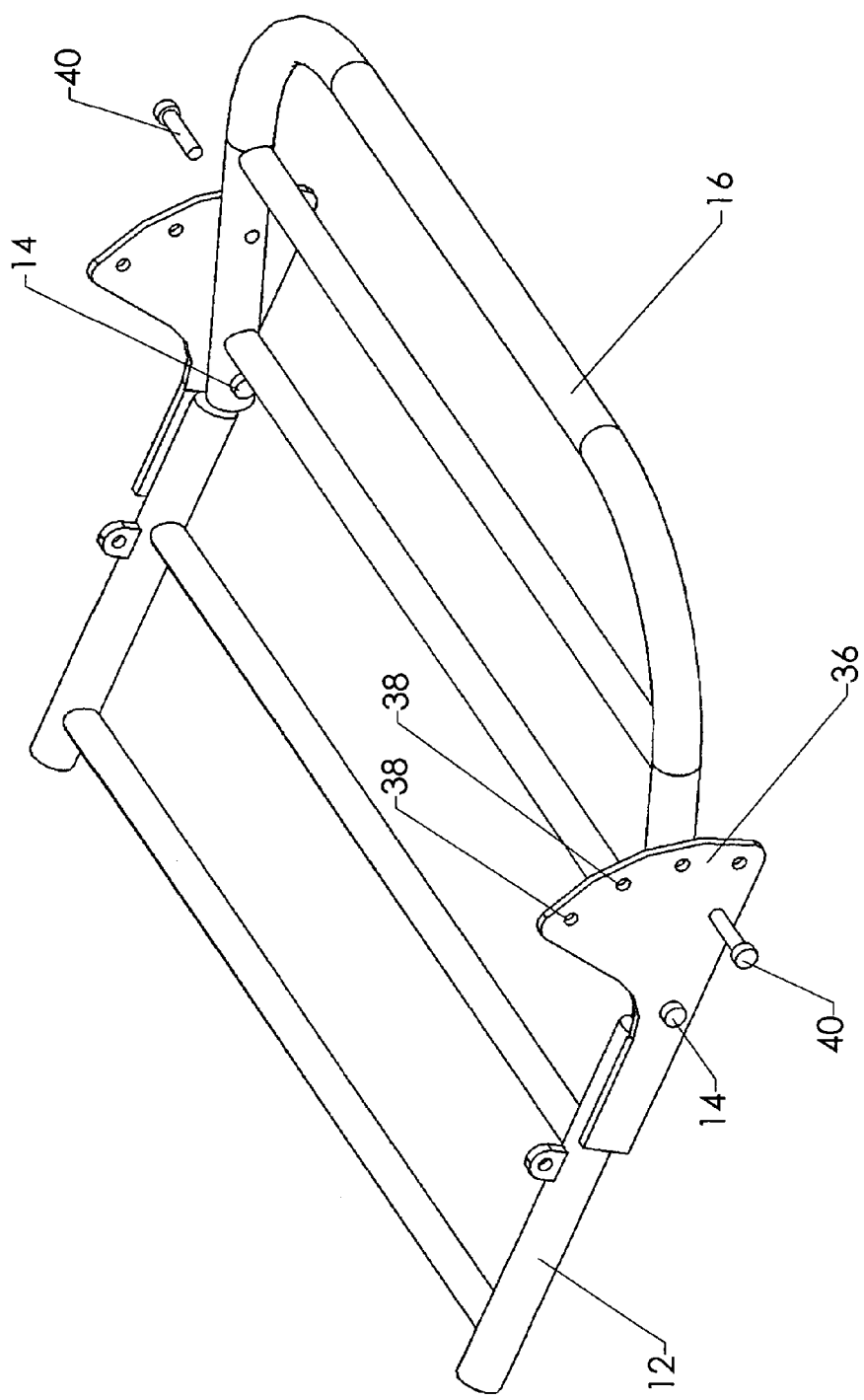
FIG. 4 is a detail view, showing the pivoting foot rest.

FIG. 4 is a detail view of foot rest 16 and the features attaching it to foot platform frame 12. Foot rest 16 is pivotally attached to the foot platform frame by a pair of pivot joints 14. These pivot joints allow the pitch of the foot rest to be adjusted with respect to the pitch of the foot platform frame. A pair of adjustment plates 36 are provided, with one plate being located on each side of the foot platform frame proximate a pivot joint 14. Each adjustment plate 36 includes a series of adjustment holes 38 located along an arc.

A locking pin 40 can be passed through a desired hole and underneath foot rest 16 to support it at a desired pitch. The locking pin can be equipped with a ball detent or other retaining feature so that it does not accidentally slip out of an adjustment hole. It can also be tied to the foot platform by a small flexible cable so that it will not be lost. A locking pin is preferably provided for both sides of the foot rest. Thus, by placing the locking pins in the appropriate adjustment holes, the user can set the pitch of the foot rest.

Figure 5:
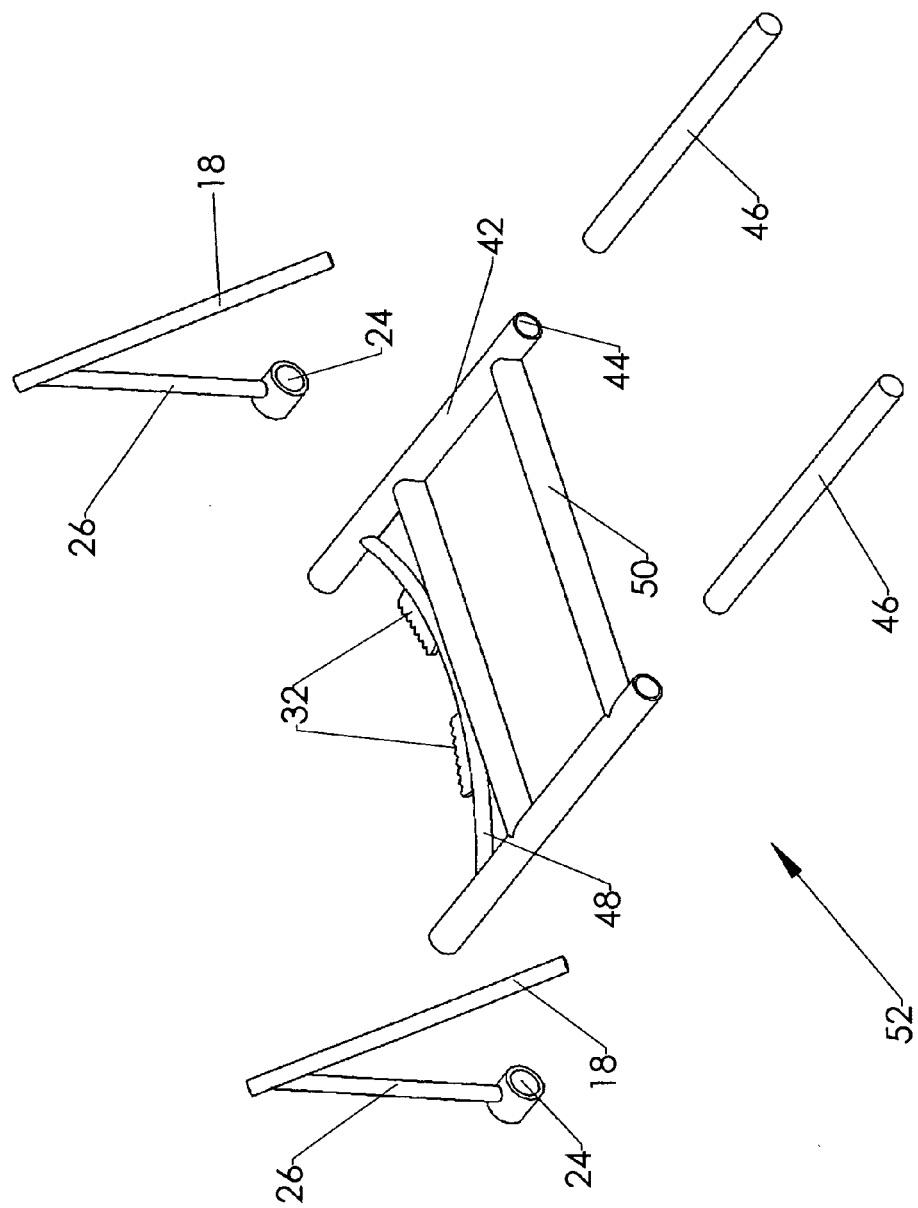
FIG. 5 is an exploded perspective view, showing the chair platform.

FIG. 5 shows an exploded view of seat platform 52. Its structure is generally similar to the foot platform. Seat platform frame 42 is composed of tubes welded together. Like the foot platform frame, it includes an arc 48 with serrated plates 32. These features are positioned to bear against the tree. Two cable guides, with associated struts 26 and pivot tubes 24 are pivotally attached to seat platform frame 42.

Seat tube 50 is located near the end of the seat platform which is furthest from the tree. It mounts an adjustable seat, which will be described subsequently. The two tubes defining the sides of the seat platform frames each end in a hollow receiver 4' which is sized to receive a climbing arm 46. These two climbing arms 46 slide out of the hollow receivers to an extended position. They are prevented from coming all the way out of the seat platform frame by mechanical stops.

Figure 6:
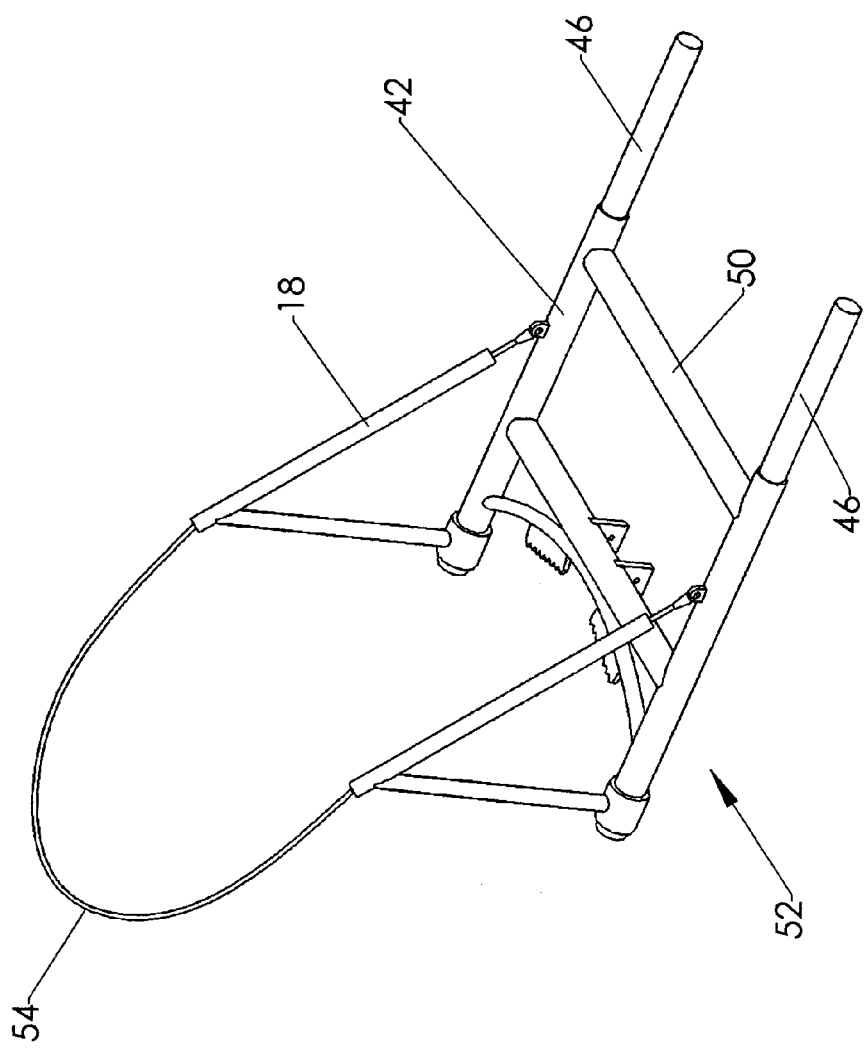
FIG. 6 is a perspective view, showing the chair platform in an assembled state.

FIG. 6 shows seat platform 52 in an assembled state, with the two climbing arms 46 in the extended position. The two cable guides 18 are pivotally attached to the side of the seat platform frame facing the tree. Upper cable 54 is installed through the hollow interiors of the two cable guides and adjustably attached to the seat platform frame. As for the foot platform, the length of the upper cable is made adjustable to accommodate different tree diameters.

Figure 7:
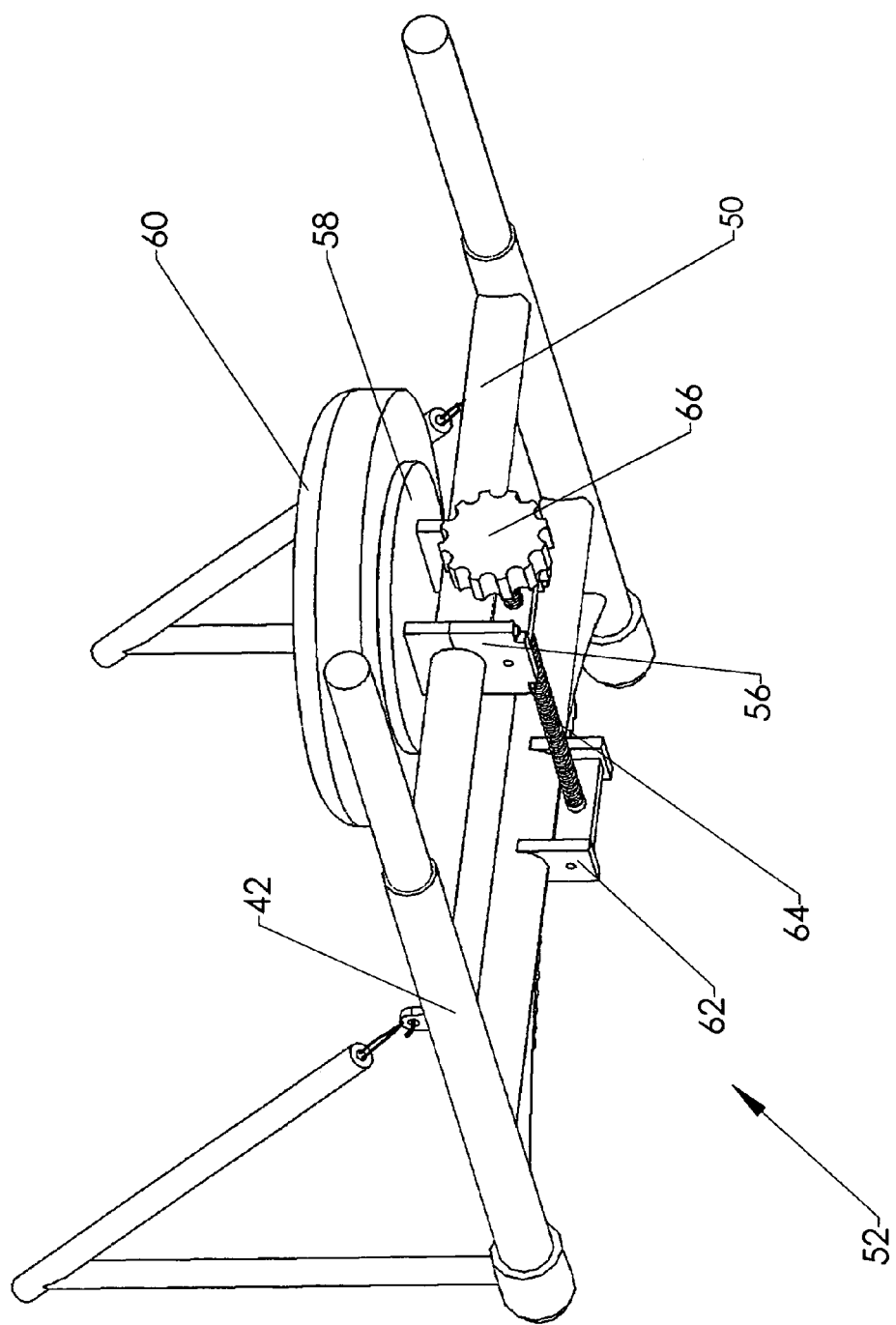
FIG. 7 is a perspective view, showing the chair platform from underneath.

FIG. 7 shows the same assembly from underneath. The reader will observe that seat 60 has been attached to seat tube 50. It is actually attached through two rotational joints—yaw pivot 58 and pitch pivot 56. Yaw pivot 58 allows the seat to swivel freely about the yaw axis. Pitch pivot 56 allows the pitch of the seat to be adjusted with respect to the seat platform frame.

The pitch is adjusted by turning pitch wheel 66. The user can perform this adjustment while seated. Pitch rod 64 is a long threaded rod. The end of the rod nearest the tree is rotatably mounted to rod anchor 62. Rod anchor 62 allows the end of the pitch rod it contains to turn freely, but not to move in or out of the rod anchor.

Figure 8:
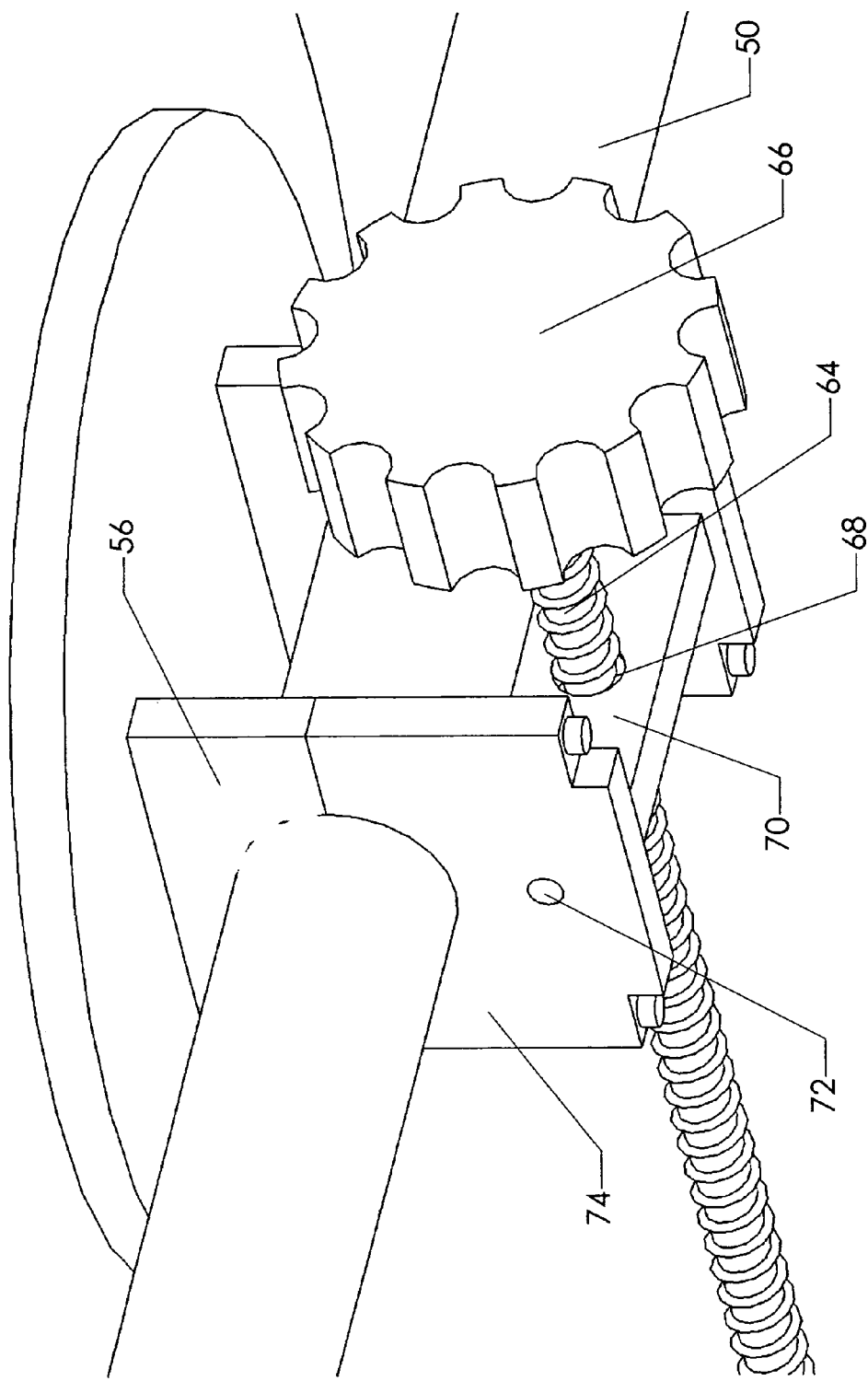
FIG. 8 is a detail view, showing the pitch adjustment mechanism of the seat.

FIG. 8 shows pitch pivot 56 in more detail. Swivel block 70 is pivotally mounted by two swivel block pins 72 to the two swivel block mounts 74 (one on either side of the pitch wheel). This feature allows the swivel block to pivot with respect to the two swivel block mounts. The reader will observe that the two swivel block mounts 74 are rigidly connected to pitch pivot 56.

Threaded hole 68 passes through the center of swivel block 70. This thread is designed to engage the external threads on threaded rod 68. Those skilled in the art will thereby realize that if the user turns the pitch wheel in a clockwise direction swivel block 70 will be forced further away from rod anchor 62, with the result that pitch pivot 56 will pitch the seat upward. If the user turns the pitch wheel in a counterclockwise direction, the swivel block will be forced closer to the rod anchor and the pitch pivot will pitch the seat downward. Thus, by turning the pitch wheel, the user can set the pitch of the seat with respect to the seat platform frame. Once the user stops turning the pitch wheel, the chair will tend to remain in the pitch set without requiring a supplemental locking means.

Figure 9:
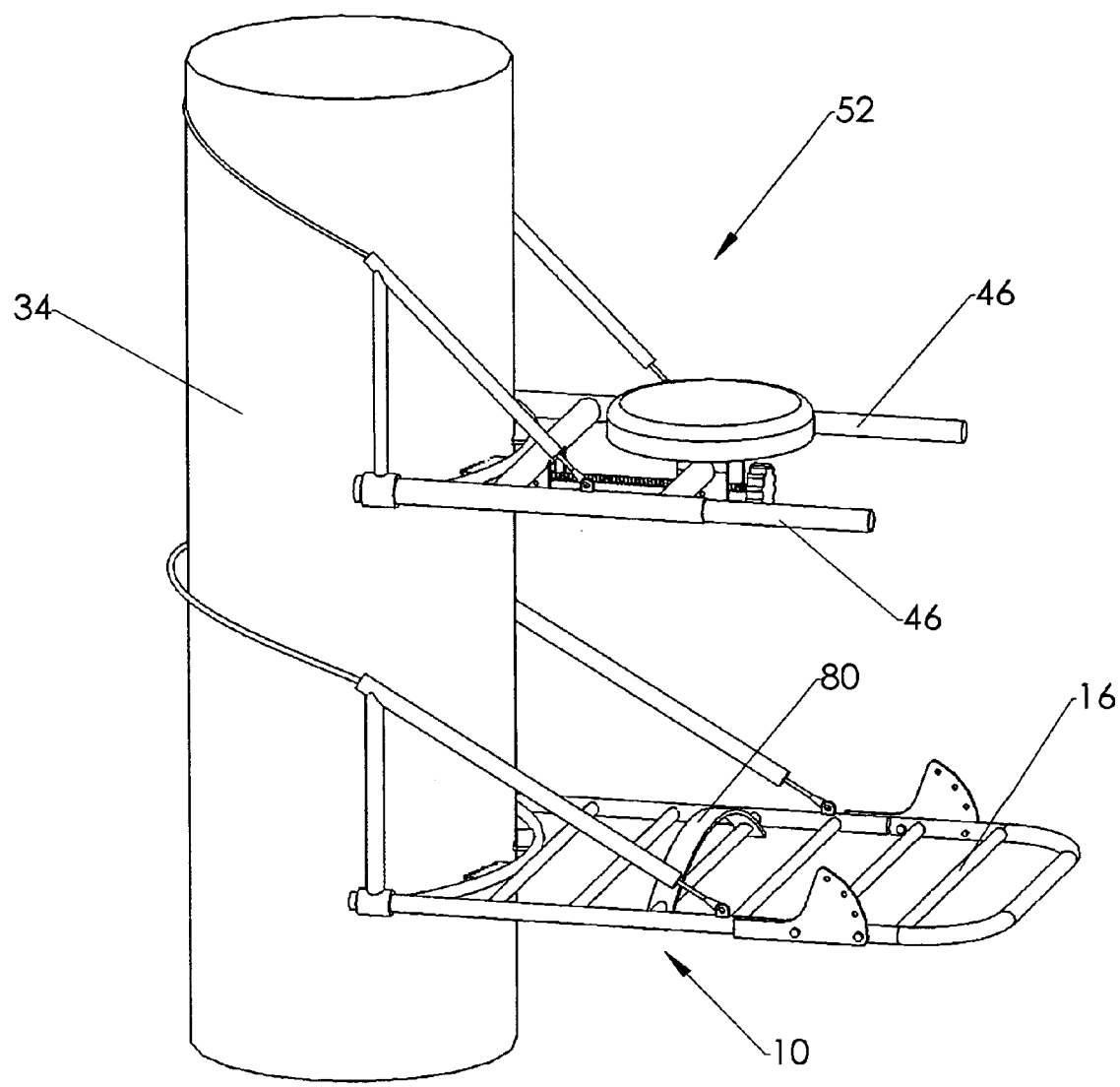
FIG. 9 is a perspective view, showing the foot platform and chair platform attached to a tree.

The operation of the invention will now be described in detail. FIG. 9 shows the invention installed on tree 34. Foot platform 10 is attached via the lower cable and seat platform 52 is attached via the upper cable. The two climbing arms 46 are shown in the extended position—ready for climbing. The user stands on the foot platform with his or her body being located between the two climbing arms. The user then lifts the seat platform up a foot or so, where it again grabs the tree and comes to rest.

Next, the user hooks his or her toes under toe loop 48 while grasping the two climbing arms. The user then pulls the foot platform up a foot or two, where it grabs the tree and comes to rest. The user is then ready to push the seat platform up another step, whereupon the cycle repeats. Many types of toe loop devices are known. The one depicted is merely a simplified representation. Those skilled in the art will know that the toe loop is merely a convenience. Some users may simply hook their feet under the frame itself to pull up the foot platform.

Figure 10:
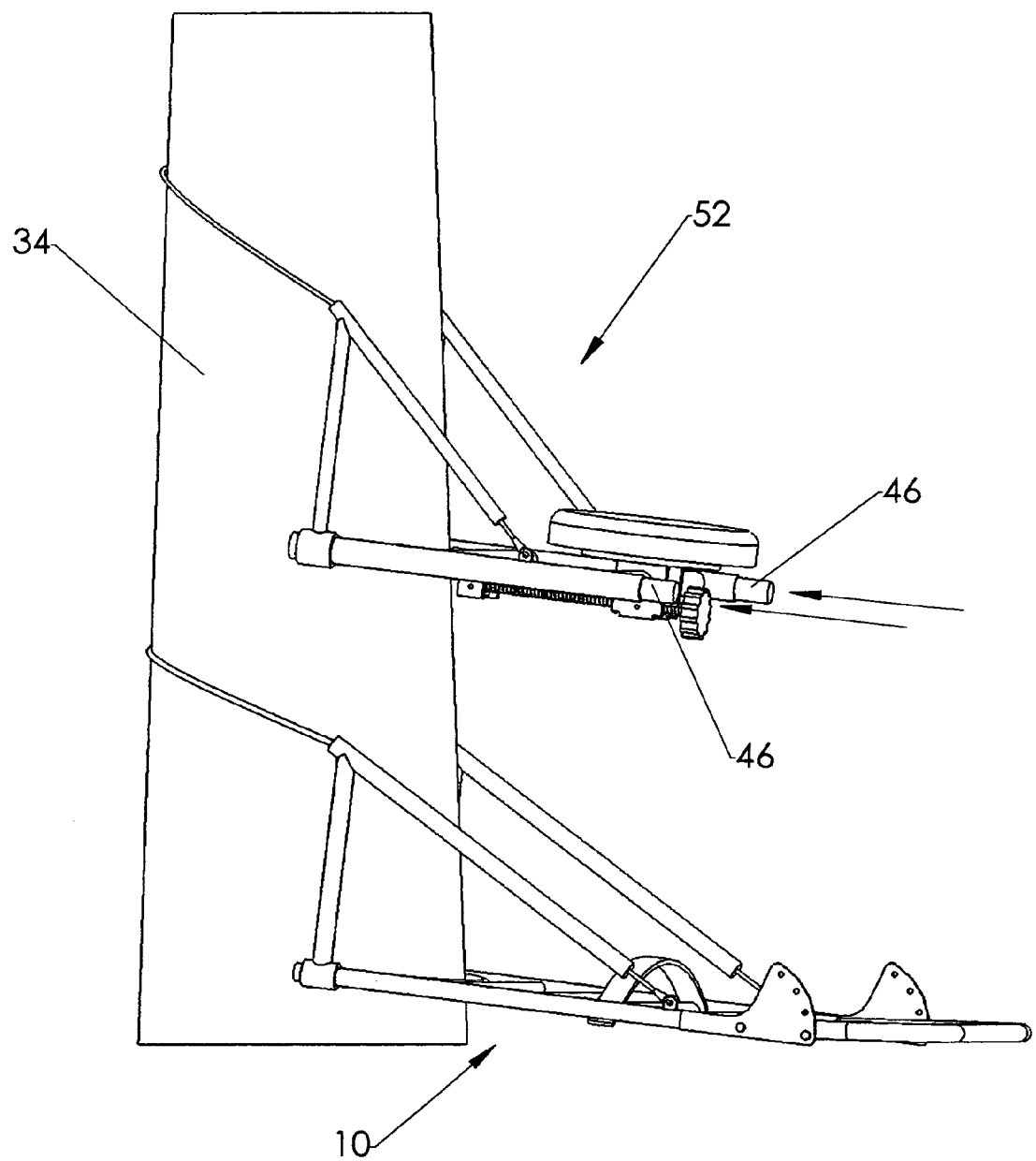
FIG. 10 is a perspective view, showing how the two climbing arms can be stowed.

The steps described are repeated until the stand has reached a desired height on the tree. The diameter of the tree has generally tapered somewhat by this point. FIG. 10 shows the result. The user generally does not have time to continually adjust the cable lengths while climbing the tree. Thus, by the time the stand is suspended high off the ground, the cable lengths are too long to keep the platforms horizontal. By this point they will slope downward as shown in FIG. 10.

The user therefore needs to adjust the stand for use. First, the user pushes the two climbing arms 46 back into the two hollow receivers. Mechanical detents can be provided to keep the climbing arms in this position. If a fairly close fit is used, friction alone will be sufficient to hold them in position. With the climbing arms stowed, the user can then sit on the seat. However, as shown, the user will be uncomfortably pitched forward.

Figure 11:
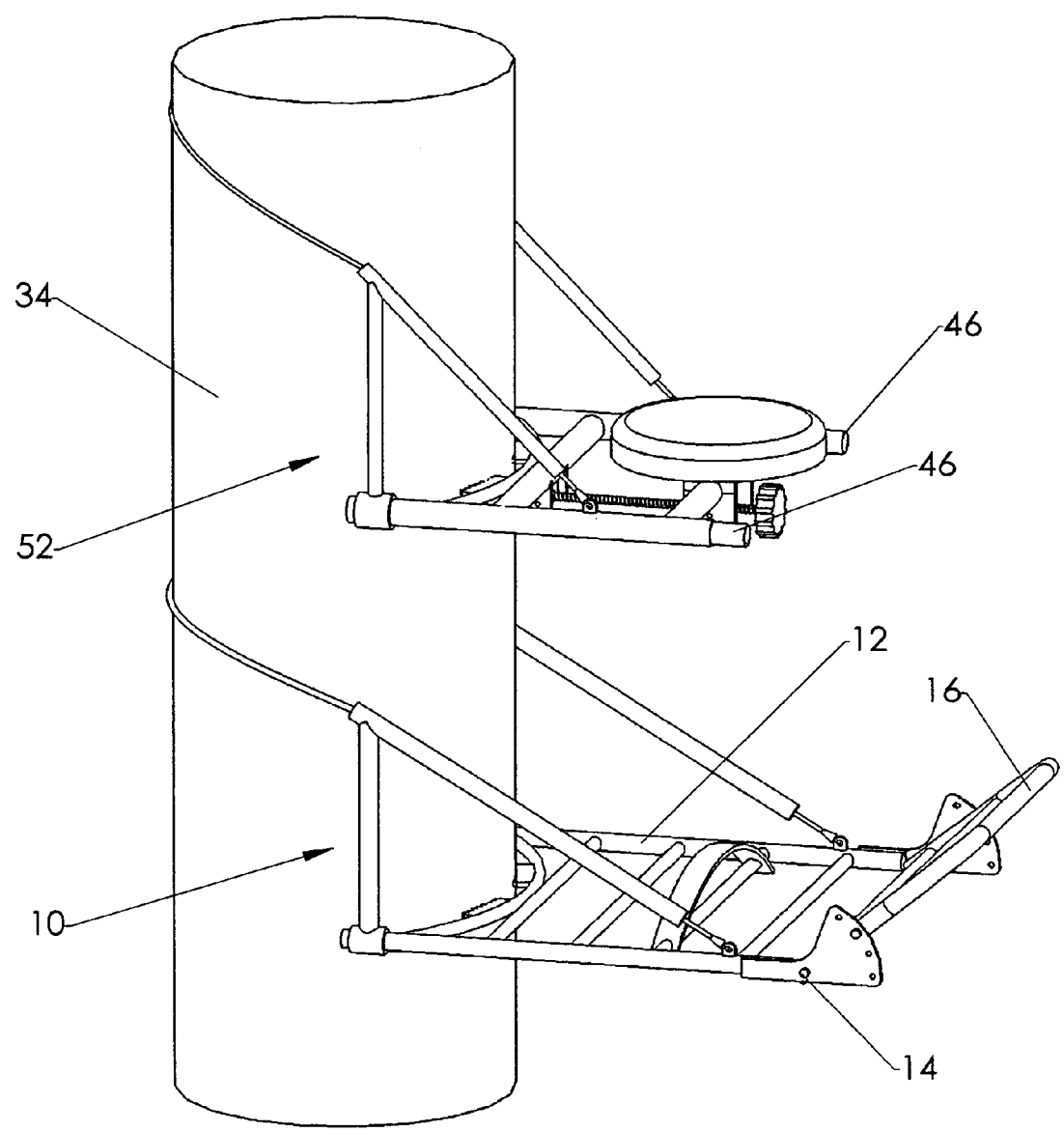
FIG. 11 is a perspective view, showing the two platforms in position on a tree.
Figure 12:
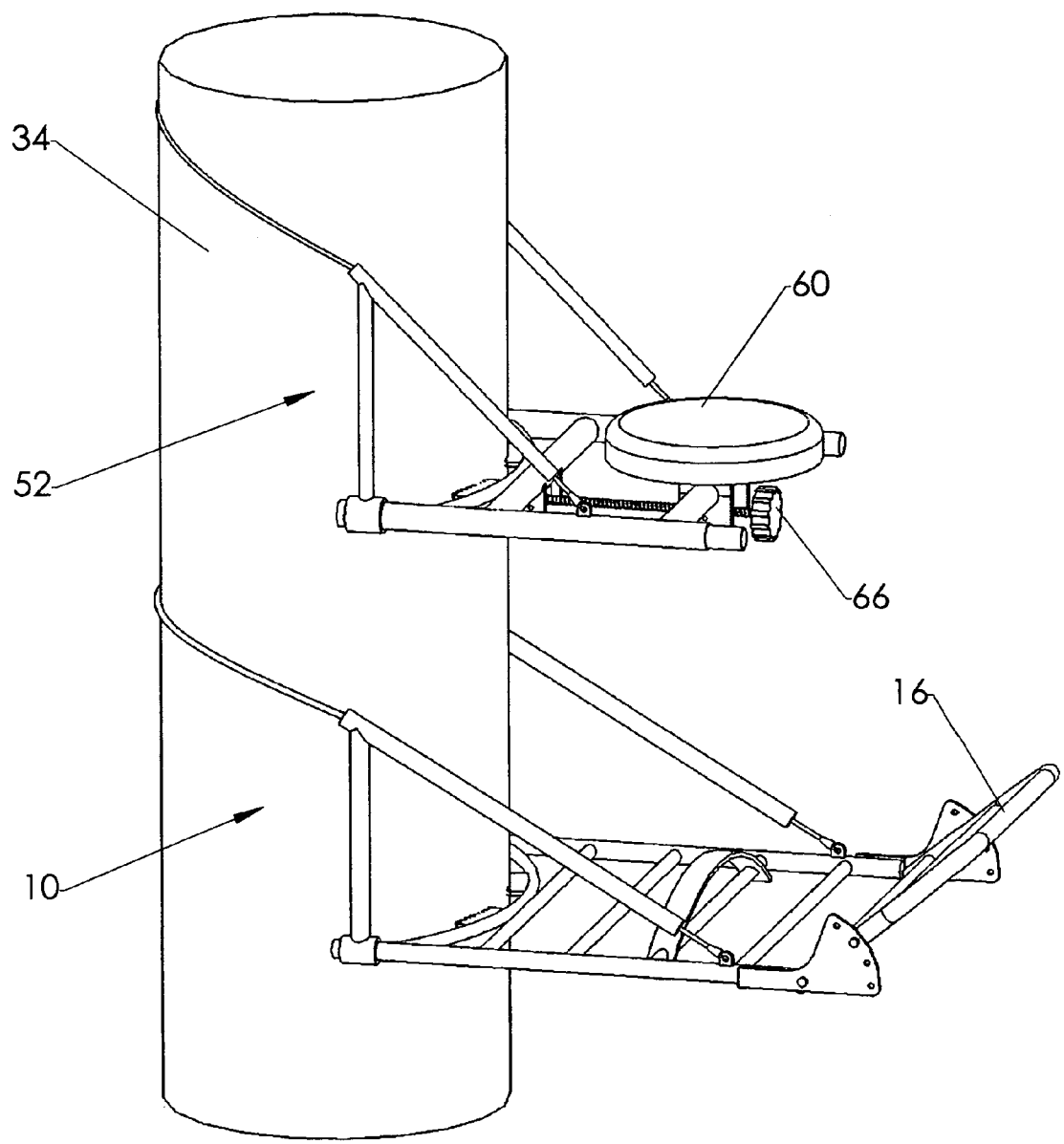
FIG. 12 is a perspective view, showing the pitch adjustment of the seat.
Figure 13:
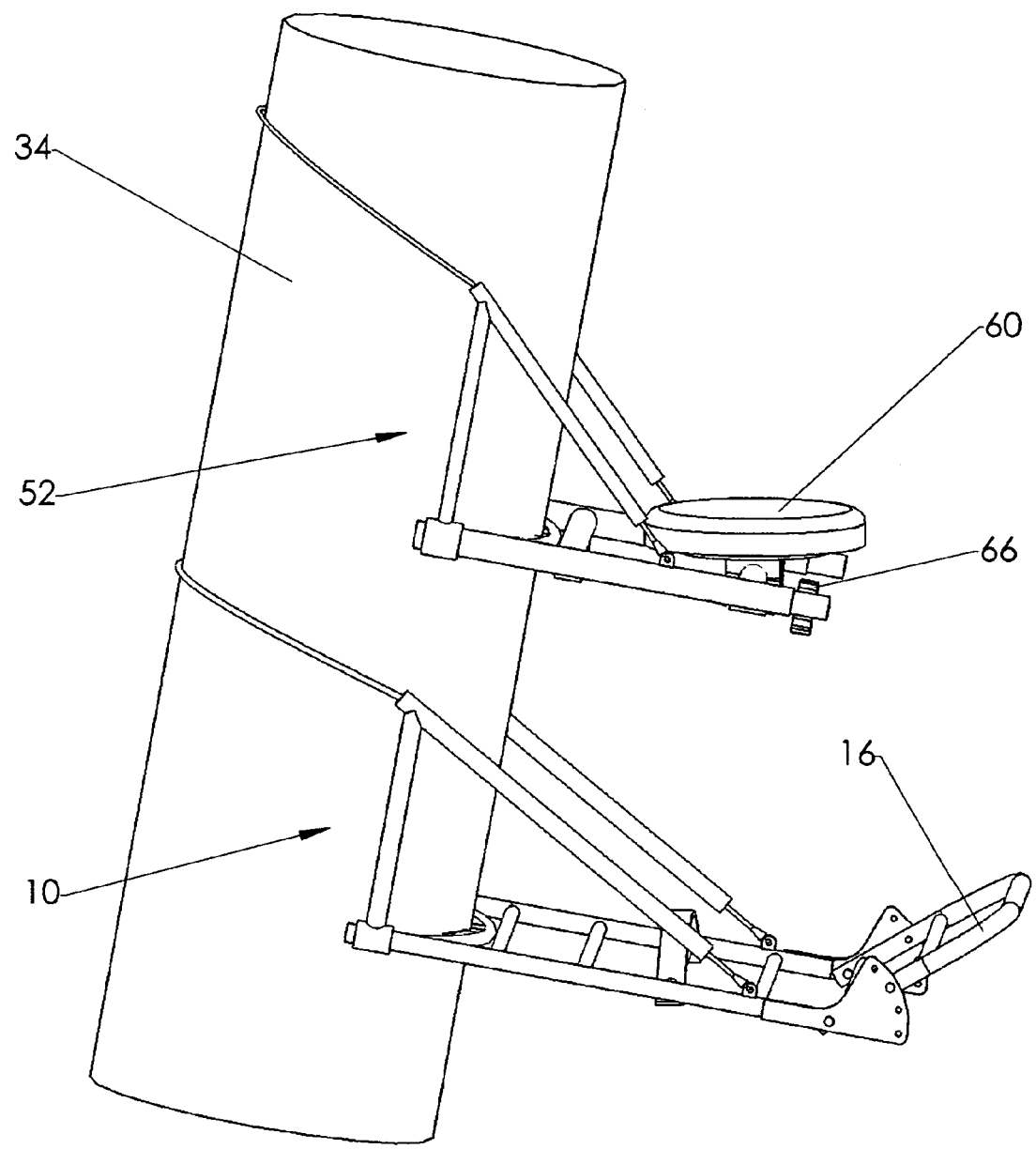
FIG. 13 is a perspective view, showing the stand in a pitch-adjusted configuration and ready for use.

In FIG. 11, the user has adjusted the pitch of foot rest 16 upward and locked it in position. In FIG. 12, the user begins turning pitch wheel 66 in a clockwise position in order to pitch seat 60 upward with respect to the seat frame. FIG. 13 shows the seat after the pitch has been adjusted to the horizontal. The stand is now ready to use. The hunter can swivel on seat 60 while maintaining his or her feet braced against foot rest 16.

Although the preceding description contains significant detail, it should not be viewed as limiting the invention but rather as providing examples of the preferred embodiments. Accordingly, the scope of the invention should be fixed by the following claims rather than by any examples given.

Having described my invention, I claim:

1. A tree stand which a user can attach to a tree, comprising:
   a. a foot platform, including
      i. a foot platform frame;
      ii. a foot rest, pivotally attached to said foot platform frame so that said foot rest can be adjusted in pitch with respect to said foot platform frame;
      iii. a first adjusting means for fixing said foot rest in a desired pitch with respect to said foot platform frame;
   b. a seat platform, including
      i. a seat platform frame;
      ii. a seat, pivotally attached to said seat platform frame so that said seat can be adjusted in pitch with respect to said seat platform frame; and
      iii. a second adjusting means for fixing said seat in a desired pitch with respect to said seat platform frame.

2. A tree stand as recited in claim 1, wherein said seat platform further comprises:
   a. a first climbing arm telescopically attached to said seat platform frame;
   b. a second climbing arm telescopically attached to said seat platform frame;
   c. wherein said first and second climbing arms can be extended from said seat platform frame so that said user can grasp said first and second climbing arms while moving said foot platform and said seat platform up or down said tree; and
   d. wherein said first and second climbing arms can be stowed within said seat platform frame when not in use.

3. A tree stand as recited in claim 2, wherein said seat further comprises a yaw pivot attaching said seat to said seat platform frame, so that said user can freely rotate said seat about a yaw axis.

4. A tree stand as recited in claim 2, wherein said first adjusting means comprises:
   a. an adjustment plate with a plurality of adjustment holes corresponding to different pitch settings for said foot rest; and
   b. a locking pin sized to fit within each of said plurality of adjustment holes to lock said foot rest at a selected pitch.

5. A tree stand as recited in claim 2, wherein said second adjusting means comprises:
   a. a swivel block extending downward from said seat;
   b. a threaded pitch rod, having a first end and a second end, wherein said first end is pivotally attached to said seat platform frame and wherein said second end is threadedly attached to said swivel block;
   c. a pitch wheel attached to said threaded pitch rod, so that said user can grasp and turn said pitch wheel in order to turn said pitch rod.

6. A tree stand as recited in claim 1, wherein said seat further comprises a yaw pivot attaching said seat to said seat platform frame, so that said user can freely rotate said seat about a yaw axis.

7. A tree stand as recited in claim 6, wherein said first adjusting means comprises:
   a. an adjustment plate with a plurality of adjustment holes corresponding to different pitch settings for said foot rest; and
   b. a locking pin sized to fit within each of said plurality of adjustment holes to lock said foot rest at a selected pitch.

8. A tree stand as recited in claim 6, wherein said second adjusting means comprises:
   a. a swivel block extending downward from said seat;
   b. a threaded pitch rod, having a first end and a second end, wherein said first end is pivotally attached to said seat platform frame and wherein said second end is threadedly attached to said swivel block;
   c. a pitch wheel attached to said threaded pitch rod, so that said user can grasp and turn said pitch wheel in order to turn said pitch rod.

9. A tree stand as recited in claim 1, wherein said first adjusting means comprises:
   a. an adjustment plate with a plurality of adjustment holes corresponding to different pitch settings for said foot rest; and
   b. a locking pin sized to fit within each of said plurality of adjustment holes to lock said foot rest at a selected pitch.

10. A tree stand as recited in claim 9, wherein said seat further comprises a yaw pivot attaching said seat to said seat platform frame, so that said user can freely rotate said seat about a yaw axis.

11. A tree stand as recited in claim 1, wherein said second adjusting means comprises:
    a. a swivel block extending downward from said seat;
    b. a threaded pitch rod, having a first end and a second end, wherein said first end is pivotally attached to said seat platform frame and wherein said second end is threadedly attached to said swivel block;
    c. a pitch wheel attached to said threaded pitch rod, so that said user can grasp and turn said pitch wheel in order to turn said pitch rod.

12. A tree stand as recited in claim 11, wherein said seat further comprises a yaw pivot attaching said seat to said seat platform frame, so that said user can freely rotate said seat about a yaw axis.

13. A tree stand as recited in claim 1, wherein:
    a. said foot platform frame includes a first arc positioned to face said tree;
    b. said first arc includes a first serrated plate positioned to frictionally engage said tree;
    c. said seat platform frame includes a second arc positioned to face said tree; and
    d. said second arc includes a second serrated plate positioned to frictionally engage said tree.

14. A tree stand as recited in claim 13, wherein said seat further comprises a yaw pivot attaching said seat to said seat platform frame, so that said user can freely rotate said seat about a yaw axis.

15. A tree stand as recited in claim 13, wherein said first adjusting means comprises:
 a. an adjustment plate with a plurality of adjustment holes corresponding to different pitch settings for said foot rest; and
 b. a locking pin sized to fit within each of said plurality of adjustment holes to lock said foot rest at a selected pitch.

16. A tree stand as recited in claim 13, wherein said second adjusting means comprises:
 a. a swivel block extending downward from said seat;
 b. a threaded pitch rod, having a first end and a second end, wherein said first end is pivotally attached to said seat platform frame and wherein said second end is threadedly attached to said swivel block;
 c. a pitch wheel attached to said threaded pitch rod, so that said user can grasp and turn said pitch wheel in order to turn said pitch rod.

17. A tree stand as recited in claim 1, wherein said foot platform further comprises:
 a. a first cable guide, pivotally connected to said foot platform frame proximate said tree;
 b. a second cable guide, pivotally connected to said foot platform frame proximate said tree; and
 c. a first cable adapted to pass through said first and second cable guides, passing around said tree, and attaching to said foot platform frame.

18. A tree stand as recited in claim 17, wherein said seat further comprises a yaw pivot attaching said seat to said seat platform frame, so that said user can freely rotate said seat about a yaw axis.

19. A tree stand as recited in claim 1, wherein said seat platform further comprises:
 a. a third cable guide, pivotally connected to said seat platform frame proximate said tree;
 b. a fourth cable guide, pivotally connected to said seat platform frame proximate said tree; and
 c. a second cable adapted to pass through said third and fourth cable guides, passing around said tree, and attaching to said seat platform frame.

20. A tree stand as recited in claim 19, wherein said seat further comprises a yaw pivot attaching said seat to said seat platform frame, so that said user can freely rotate said seat about a yaw axis.

* * * * *